United States Patent
Rees et al.

[11] Patent Number: 5,279,068
[45] Date of Patent: Jan. 18, 1994

[54] CROP ROW DEVIATION SENSING DEVICE

[76] Inventors: Steven J. Rees, "Talahasse", Croppa Creek NSW 2411; Craig R. Smith, Lot 3. Vitonga Road, Moree NSW 2400, both of Australia

[21] Appl. No.: 906,519
[22] Filed: Jun. 30, 1992

[30] Foreign Application Priority Data
Aug. 19, 1991 [AU] Australia .................... 82563/91

[51] Int. Cl.5 ................................................ A01C 1/00
[52] U.S. Cl. ..................................... 47/1.7; 180/169
[58] Field of Search ......................... 47/1.7; 180/169

[56] References Cited
U.S. PATENT DOCUMENTS

| | | |
|---|---|---|
| 4,206,565 | 6/1980 | Randolph ................ 47/1.7 |
| 4,526,236 | 7/1985 | Jacobsen . |
| 4,700,301 | 10/1987 | Dyke ...................... 180/169 |
| 4,706,773 | 11/1987 | Reinaud .................. 180/169 |
| 4,986,473 | 1/1991 | Semple et al. . |

Primary Examiner—Henry E. Raduazo
Attorney, Agent, or Firm—Peter D. Keefe

[57] ABSTRACT

A device for keeping row crop spraying booms, cultivating tools and other agricultural equipment in the correct position relative to rows of plants, where infrared beams are used to determine the position of the booms or tools in relation to the rows, and activates rams or other actuators to move the booms or tools to the desired relationship with the rows when preset allowable deviation is exceeded.

11 Claims, 2 Drawing Sheets

CROP ROW DEVIATION SENSING DEVICE

BACKGROUND OF THE INVENTION

1. Field of the Invention

This invention relates to a crop row deviation sensing device. The device is particularly suitable for, but not limited to, sprayers or cultivation equipment for row crops.

2. Prior Art

Many crops are grown in rows, e.g. corn and sorghum.

The control of weeds and insects is a major problem. Both environmental concern and the high costs of liquid herbicides have resulted in the need to apply the minimum quantities of herbicides and insecticides for maximum weed- or insect-control. To provide plant growth, there has been a trend towards liquid fertilizers for ease of application but again, the costs of the fertilizers are high and high application efficiency must be sought.

There is a need for a system to ensure that liquid sprays can be accurately applied to, or between, the rows of plants and such a system is required for controlled cultivation of weeds between the rows.

Various proposals have been put forward to control the relationship of the spray nozzle to the plants. In U.S. Pat. No. 4,986,473 (D. G. Semple et al), it is proposed to provide a large cover over the spray boom and individual spray loads over each nozzle, the loads having essentially the same shape as the nozzle spray patterns, to control or limit any overspray.

In U.S. Pat. No. 4,526,236 (R. O. Jacobsen), a field marker for a spray boom is disclosed which is used to indicate the edge of the area which has been sprayed in a pass over a crop.

Neither of these documents disclose an arrangement where the relationship of the spray nozzles, or cultivating equipment, relative to the crop rows is accurately controlled.

SUMMARY OF THE PRESENT INVENTION

It is an object of the present invention to provide a device where the relationship of the spray nozzles, or cultivating tines, can be accurately controlled relative to the plants in the crop rows.

It is a preferred object to use infra-red sensors to monitor the relationship of the nozzles or tines relative to the plants.

It is a further preferred object to provide actuators, controlled by control equipment connected to the sensor, to move the nozzles or tines into the correct relationship with the rows when any unwanted deviation occurs.

It is a still further preferred object to provide such a device which is readily adaptable to a wide range of agricultural equipment, e.g. row crop pickers, or harvesters, sprayers, cultivators.

Other preferred objects will become apparent from the following description.

In one aspect, the present invention resides in a crop row deviation sensing device for agricultural equipment including:

at least one infra-red transmitter and receiver sensor pair on the equipment to travel between a pair of adjacent crop rows;

control circuit means operably connected to the sensor means; and actuator means on the equipment, connected to the control circuit means, operable to move the equipment relative to the crop rows when the sensor pair detects that a preset allowable deviation of the equipment relative to the crop rows has been exceeded.

In a second aspect, the sensing device may have the sensor pair arranged to travel above a single crop row and the actuator means is operable to move the equipment when the present allowable deviation is detected.

In further aspects, the present invention resides in agricultural equipment, e.g. crop sprayers and cultivation equipment, fitted with the sensing device where the spray bars or tool bars may be reciprocally mounted on fixed booms or sub-frame, the spray bars or tool bars are fixed on reciprocally mounted booms or sub-frames on the main frame; or where the main frame is reciprocally mounted relative to a towing/support vehicle.

Preferably, the sensor pair(s) have the infrared transmitter (Tx) and receiver (Rx) operating in the diffuse proximity mode with a definable range (variable power range) between two rows of plants, or above a single row of plants, so that when the rows deviate from the original direction, the rows will move into, or out of, the range defined to cause the control system to operate the actuators to put the two rows back into, or out of, the defined range.

The actuators are preferably hydraulic or pneumatic rams, although mechanical or electrical actuators (e.g. linear motors, screws and travelling nuts) may be employed if preferred.

DETAILED DESCRIPTION OF PREFERRED EMBODIMENTS

Figure 1:
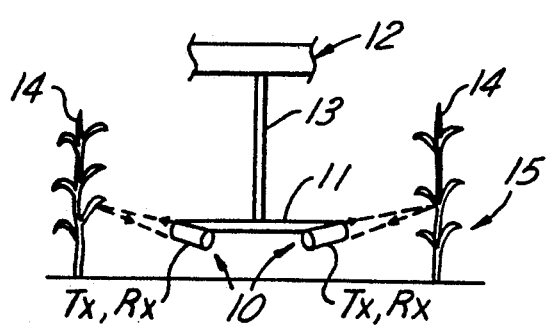
FIG. 1 is a front view of the arrangement of the sensor pairs for a first embodiment of the device.
Figure 2:
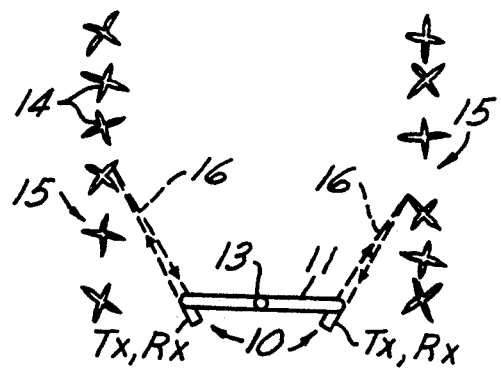
FIG. 2 is a top view corresponding to FIG. 1.

Referring to FIGS. 1 and 2, a pair of infra-red transmitter (Tx) and receiver (Rx) sensor pairs 10 are mounted at the ends of a lateral cross-arm 11 suspended from the agricultural equipment 12 via a vertical leg 13. The sensor pairs 10 have their transmitters (Tx) and receivers (Rx) operating in the diffuse proximity mode with a definable range.

Figure 5:
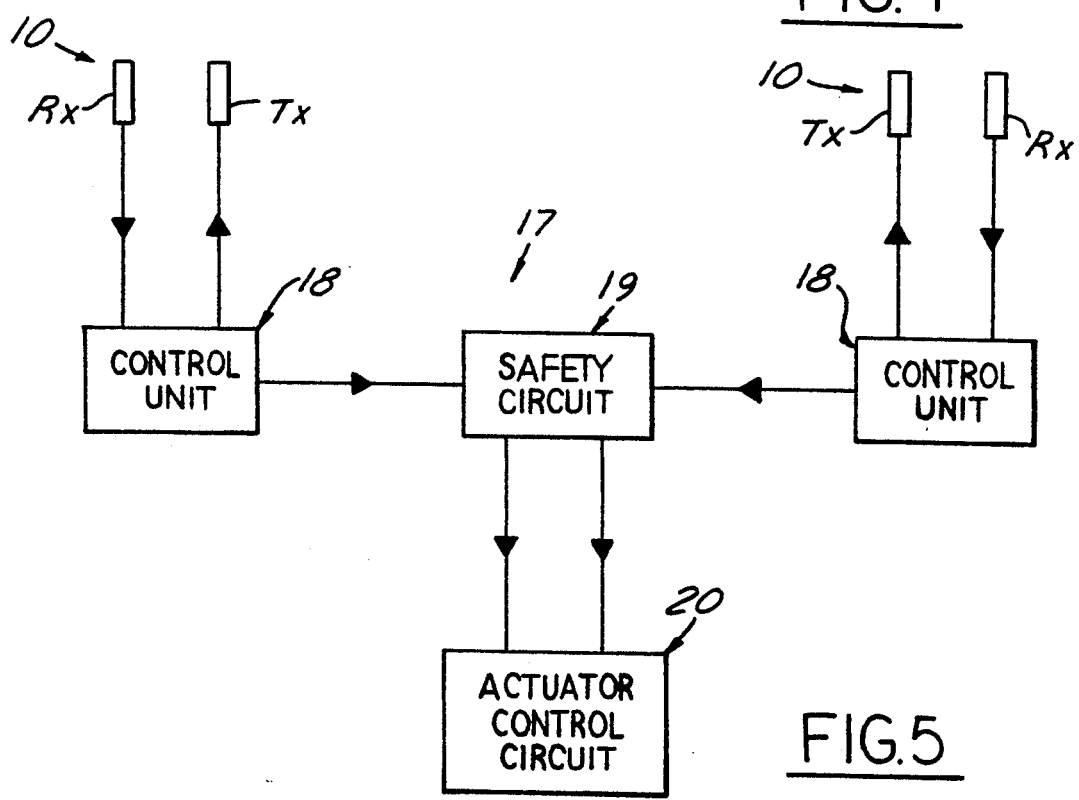
FIG. 5 is a schematic block diagram of the device.

The sensor pairs 10 are mounted below the maximum height of the plants 14 in the crop rows 15 and as shown in FIG. 2, are aligned obliquely along the two adjacent rows 15. The power and direction of the transmitters (Tx) are set so that the infra-red beams 16 will be reflected by the plants 14 back to the receivers (Rx) when the sensor pairs 10 pass between the rows within a preset allowable deviation from the desired path centrally of the two rows 15. When the travel of the sensor pairs 10 exceeds the preset allowable deviation, the control equipment 17 (FIG. 5) operates an actuator to move the equipment until the sensor pairs see the plants again (i.e. the sensor pair path is again within the preset allowable deviation from the central path).

The transmitters (Tx) and receivers (Rx) have control units 18 which enable the range (i.e. power) and time delay for the sensor pairs 10 to be selectively set and a safety circuit 19 ensures that the control units 18 will not activate the actuator control circuit 20 in both directions at the same time (i.e. the actuator remains stationary). The actuator control circuit 20 may control or operate, or incorporate, hydraulic or pneumatic valves (or electrical switches) which control the extension or retraction of hydraulic or pneumatic rams (or linear electric motors) mounted on the agricultural equipment.

Figure 3:
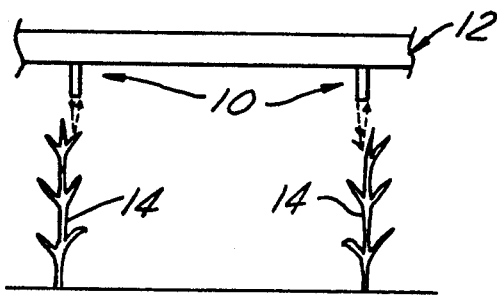
FIG. 3 is a front view of a second embodiment of the device.

Referring now to FIG. 3, the sensor pairs 10 are mounted on the equipment 12 to pass over the plants 14 in the rows 15 and the actuator control circuit 20 will be operated if the sensor pairs can no longer "see" the plants 14.

Figure 4:
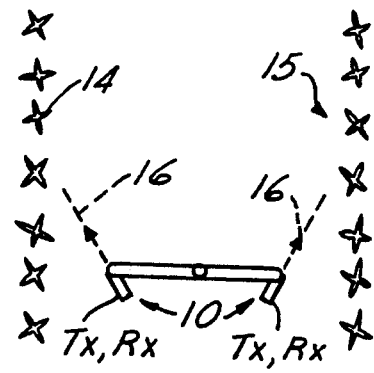
FIG. 4 is a top view of a third embodiment of the device.

In the embodiment of FIG. 4, the power and direction of the beams 16 of the transmitters (Tx) are set so that the beams 16 are not reflected back to the receivers (Rx) by the plants 14. When the rows 15 deviate and come into the power range of the transmitters (Tx), the beam 16 is reflected and then detected in the receiver(s) (Rx) which then cause the control unit to operate the actuator control circuit 20 to correct the deviation. In this embodiment, the safety circuit 19 is de-activated to allow operation of the actuator control circuit 20 until the deviation is corrected.

It will be readily apparent to the skilled addressee that the control units 18 incorporate time delay circuitry as there will be no reflected infra-red beams 16 when the transmitted beams 16 are momentarily between adjacent plants 14, and to "smooth out" the operation of the actuator control circuit 20.

Figure 6:
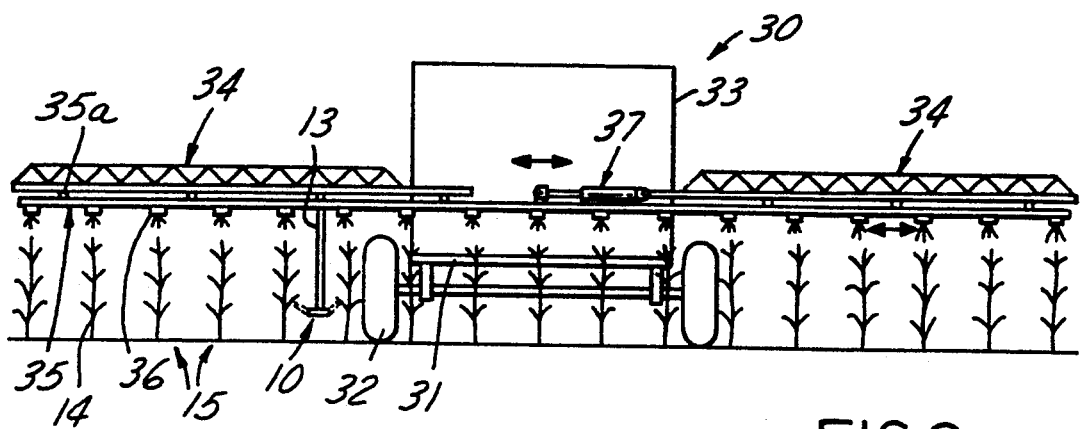
FIG. 6 is a front view of a first embodiment of (crop spraying) equipment fitted with the device.

Referring now to FIG. 6, a row crop sprayer 30 has a main frame 31 mounted on ground wheels 32 and supports a tank 33 (e.g. for liquid fertilizer, herbicide or insecticide) and suitable motor-pumping equipment (not shown). A pair of booms 34 extend laterally from the main frame 31 (and may be hingedly mounted to enable the booms 34 to be folded for transport).

A spray bar 35 is reciprocally mounted (e.g. in bushes 35a) on each boom 34 and is provided with spray nozzles 36 at a spacing equal to the spacing between the rows 15 of plants 14.

A hydraulic or pneumatic ram 37 (or a linear electric motor), mounted on a boom 34 is connected to the spray bar 35 to reciprocally move the latter transversely to the direction of travel of the sprayer 30.

The leg 13 of the sensing device depends from a boom 34 to position the sensor pair 10 between a pair of adjacent rows 15 of the plants.

For simplicity, only one ram 37 and one sensor pair 10 has been shown. Each boom 34 and spray bar 35 may have its own ram 37 and sensor pair 10 combination.

As the sprayer 30 advances through the crop, the spray nozzles 36 direct liquid fertilizer directly onto the plants 14 in the rows 15. If there is any deviation of the plants 14 relative to the nozzles 36 which exceeds a preset allowable deviation, the ram 37 is operated to move the spray bar 35 (and nozzles 36), relative to the main frame 31 to bring the nozzles 36 and plants 14 back into register.

Figure 7:
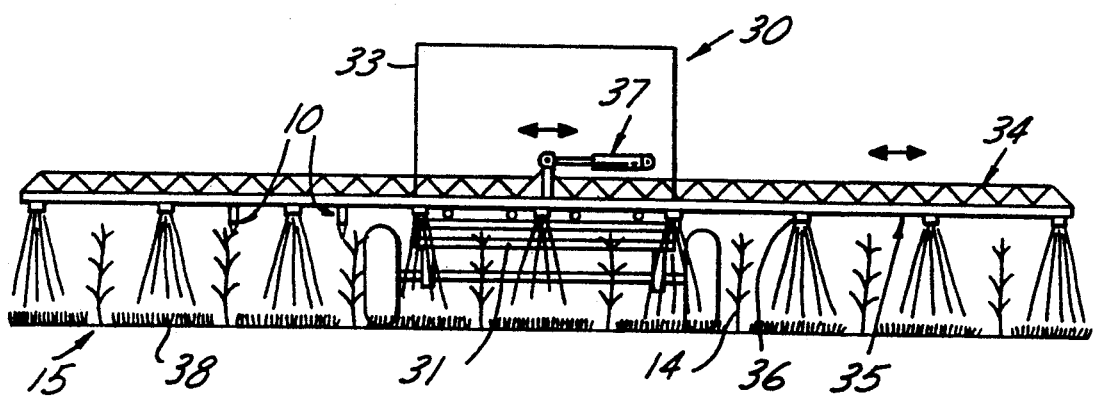
FIG. 7 is a front view of a second embodiment of equipment fitted with the device.

In the embodiment of FIG. 7, the sensor pairs 10 are arranged as shown in FIG. 3, and the spray bar 35 and nozzles 36 are fixed on the booms 34 which are movable transversely relative to the main frame 31 (and plants 14) when the sensor pairs 10 detect excessive deviation of the rows 15 relative to the sprayer 30 (i.e. the plants 14 move outside the detector zone of the receivers (Rx)). The nozzles 36 spray herbicide onto the weeds 38 between the rows 15.

Figure 8:
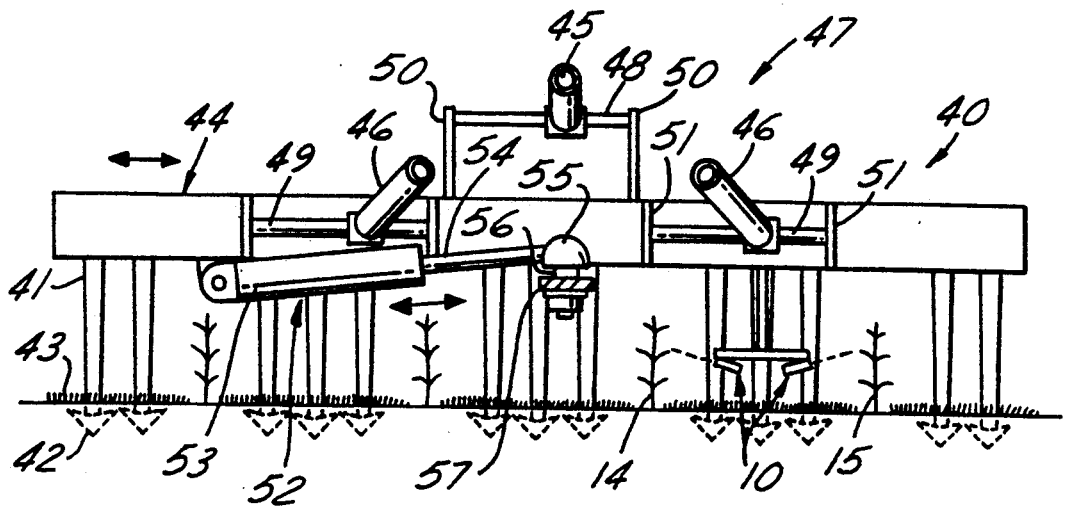
FIG. 8 is a front view of a third embodiment of (crop row cultivation) equipment fitted with the device.

FIG. 8 shows a cultivator 40 with tines 41 and digging points (or shares) 42 for between-row cultivation of the weeds 43.

The tines 41 may have a solid or spring-release mounting on the frame 44 of the cultivator 40, the frame 44 being supported by the upper and lower arms 45, 46 of a three-point linkage 47 on the back of a tractor (not shown). The distal ends of each arm 45, 46 slidably receive mounting bar 48, 49 between bracket pairs 50, 51 on the frame 44.

A hydraulic ram 52, controlled by the actuator control circuit 20, has its cylinder 53 pivotally mounted on the frame 44 and its piston rod 54 pivotally connected via a socket 55 to a tow ball 56 on the tow bar 57 of the tractor. By extension or retraction of the ram 52, the cultivator 40 can be moved transversely relative to the tractor (and thereby the rows 15) when excessive deviation is detected by the sensor pairs 10. The maximum allowable deviation will be set to prevent the digging points 42 from disturbing the roots of the plants 14.

While FIGS. 6 to 8 illustrate a crop sprayer 30 and an inter-row cultivator 40, it will be readily apparent to the skilled addressee that the device can be used to control the picking heads on row pickers; the harvesting heads on harvesters; or other agricultural equipment which may be required to travel between rows without damage to the plants.

Advantages of the device include:

(a) more accurate spraying or cultivation of row crops;

(b) higher operating speed of the equipment along the rows;

(c) a reduction in chemical usage due to more accurate application;

(d) plant damage is reduced and deviation is sensed without physical contact with the plants;

(e) the system is suitable for dry land crops, irrigated crops, solid plant or skip row planting configuration; and (f) the system is simple and durable.

Other advantages will be apparent to the skilled addressee.

Various changes and modifications may be made to the embodiments described and illustrated without departing from the present invention defined in the appended claims.

We claim:

1. A crop row deviation sensing device for agricultural equipment comprising:

sensor means comprising at least one infra-red transmitter and receiver sensor pair located on the agricultural equipment so as to travel with the agricultural equipment between a pair of adjacent crop rows for sensing crop row deviation with respect to the agricultural equipment;

control circuit means operably connected to said sensor means; and actuator means located on the agricultural equipment and connected to said control circuit means for effecting movement of the agricultural equipment relative to the pair of adjacent crop rows when said sensor means detects that a preset allowable deviation of location of the agricultural equipment relative to the pair of adjacent crop rows has been exceeded so that deviation of location of the agricultural equipment relative to the pair of adjacent crop rows becomes less than said preset allowable deviation.

2. A crop row deviation sensing device for agricultural equipment comprising:

sensor means comprising at least one infra-red transmitter and receiver sensor pair located on the agricultural equipment to travel with the agricultural equipment above a crop row;

control circuit means operably connected to said sensor means; and actuator means located on the agricultural equipment and connected to said control circuit means for effecting movement of the agricultural equipment so as to restore the agricultural equipment above the crop row within a preset allowable deviation with respect thereto when said sensor pair detects that the preset allowable deviation has been exceeded.

3. The device according to claim 1 or claim 2 wherein:

said transmitter and said receiver of said sensor pair are operated in a diffuse proximity mode with a definable power output range.

4. The device according to claim 3 wherein:

said control circuit means operates said actuator means when an infra-red beam transmitted by said transmitter of said sensor pair is not reflected back to, and detected by, said receiver of said sensor pair.

5. The device according to claim 3 wherein:

said control circuit means operates said actuator means when an infra-red beam transmitted by said transmitter of said sensor pair is reflected back, and detected by, said receiver of said sensor pair.

6. The device according to claim 3 wherein:

said preset allowable deviation is adjustable and is set by selection of a power output within said definable power output range and by selection of direction of the infra-red beam transmitted by said transmitter of said sensor pair relative to the agricultural equipment.

7. The device according to claim 3 wherein:

said sensor means comprises at least two infra-red transmitter and receiver sensor pairs; wherein further:

said control circuit means includes safety circuit means for preventing operation of said actuator means if two of said at least two sensor pairs seek to simultaneously operate said actuator means in opposite directions.

8. The device according to claim 3 wherein:

said actuator means comprises an actuator selected from the group consisting of: a hydraulic ram having control valve means controlled by said control circuit means, a pneumatic ram having control valve means controlled by said control circuit means, and a linear electric motor having a switch controlled by said control circuit means.

9. The device according to claim 1 or claim 2, further comprising the agricultural equipment, wherein said agricultural equipment comprises:

a main frame supported on a support structure, the support structure being selected from the group consisting of: ground wheels and a prime mover;

an auxiliary frame structure selected from the group consisting of: at least one sub-frame and at least one boom, said auxiliary frame structure extending from said main frame transversely relative to a direction defined by travel of said main frame; and a bar structure selected from the group consisting of: at least one tool-bar and at least one spray bar, said bar structure being reciprocably mounted on said auxiliary frame structure;

wherein said actuating means operably moves said bar structure relative to said auxiliary frame structure.

10. The device according to claim 1 or claim 2, further comprising the agricultural equipment, wherein said agricultural equipment comprises:

a main frame supported on a support structure, the support structure being selected from the group consisting of: ground wheels and a prime mover;

an auxiliary frame structure selected from the group consisting of: at least one sub-frame and at least one boom, said frame structure being reciprocably mounted on said main frame, said auxiliary frame structure extending transversely relative to a direction defined by travel of said main frame; and a bar structure selected from the group consisting of: at least one tool-bar and at least one spray bar, said bar structure being mounted on said auxiliary frame structure;

wherein said actuating means operably moves said auxiliary frame structure relative to said main frame.

11. The device according to claim 1 or claim 2, further comprising the agricultural equipment, wherein said agricultural equipment comprises:

a main frame mounted on a three-point linkage of a prime mover for movement transversely to a direction defined by travel of the prime mover;

wherein said actuating means comprises an actuator interconnecting said main frame with respect to the prime mover for operably moving said main frame transversely relative to the direction of travel of the prime mover.

* * * * *